Patented Feb. 12, 1952

2,585,163

UNITED STATES PATENT OFFICE 2,585,163

SYNTHETIC LINEAR POLYAMIDES

Donald Cargill Pease and Carleton Thomas Handy, Wilmington, Del., assignors to E. I. du Pont de Nemours & Company, Wilmington, Del., a corporation of Delaware No Drawing. Application March 25, 1950, Serial No. 152,006

3 Claims. (Cl. 260—78)

This invention relates to synthetic linear polyamides and, more particularly, to a new synthetic linear polyamide of the nylon type which has superior fiber and bristle properties, and to the process of preparing same.

Synthetic linear polyamides have achieved considerable importance as fibers for use in textiles. They have also found utility in bristle applications. The polyamides which have achieved importance in these uses are of the general types described in U. S. Patents 2,071,250, 2,071,253 and 2,130,948 and can be obtained by self-polymerization of a monoaminocarboxylic acid, by reacting a diamine with a dibasic carboxylic acid in substantially equimolecular amounts, or by reacting a monoaminomonohydric alcohol with a dibasic carboxylic acid in substantially equimolecular amounts. In place of the acids, amines, and alcohols, equivalent amide-forming derivatives may be used. The polyamides obtained have an intrinsic viscosity of at least 0.4. On hydrolysis with hydrochloric acid, the amino acid polymers yield the amino acid hydrochloride, the diamine-dibasic acid polymers yield the diamine hydrochloride and the dibasic carboxylic acid, and the amino alcohol-dibasic acid polymers yield the amino alcohol hydrochloride and the dibasic carboxylic acid.

Of the polyamides, those that have achieved commercial importance for fiber applications in view of their superior properties, e. g., heat setting properties, are usually opaque, generally have an intrinsic viscosity considerably exceeding 0.4 and, usually, 0.8 or higher, and withstand ironing temperatures but melt without decomposition under spinning conditions, e. g., at 225–300° C. To obtain these preferred properties in polyamides, it is generally desirable to start with dibasic carboxylic acids and diamines which have at least 6 carbons separating the carboxylic hydroxyl and amine groups.

An object of the present invention is to provide a new synthetic linear polyamide and a process for preparing same. A further object is to provide such a polyamide having an intrinsic viscosity of at least 0.8 and a desirable softening point sufficiently high for ironing and textile handling operations but below the decomposition point of the polyamide. A more particular object is to provide such a polyamide giving oriented films and fibers having exceptionally low shrinkage in boiling water, and bristles characterized by superior stiffness and a high rate of recovery from a sharp bend. Other objects will be apparent from the description of the invention given hereinafter.

The above objects are accomplished by reacting a diamine mixture consisting, by weight, of 50%–90% of a normally solid mixture of stereoisomers of di(p-aminocyclohexyl) methane and 50%–10% of a normally liquid mixture of stereoisomers of di(p-aminocyclohexyl) methane, with a substantially equimolecular proportion of glutaric acid, under polyamide-forming conditions, e. g., heating, preferably under pressure at first and then followed by vacuum heating at 200° C.–300° C. In this manner a new synthetic linear polyamide is obtained having an intrinsic viscosity of at least 0.8, and which melts within the range of 260° C.–290° C. and is characterized by unexpected superiority in the low shrinkage in boiling water of oriented articles made therefrom, and the resilience and rapid recovery from sharp bends of fibers, bristles, and the like made therefrom.

Di(p-aminocyclohexyl) methane is a diamine having the following structural formula:

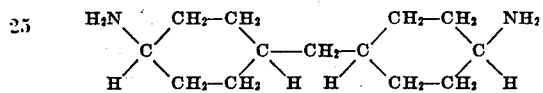

from which it can be seen that stereoisomers arise from the different possible relationships of the bonds of the carbons attached to the bridge methylene and the carbons attached to the amino groups with respect to the cyclohexyl ring (i. e., the cis and trans configurations of the carbon-hydrogen bonds of those carbons in the above formula which have only one hydrogen). The three expected isomers differ in physical properties, particularly in melting points. The above diamine is obtained as a mixture of isomers by hydrogenation of di(p-aminophenyl)methane. This latter compound results from the reaction of formaldehyde with aniline. Depending upon the choice of conditions for the hydrogenation either a mixture of stereoisomers is obtained that is liquid at 25° C., i. e., normally liquid, or a mixture is obtained that is solid at 25° C., i. e., normally solid, the latter mixture generally melting above 40° C.

The preparation and properties of the normally solid mixture of stereoisomers of di(p-aminocyclohexyl) methane, equally correctly termed bis(4-aminocyclohexyl) methane, are fully disclosed in U. S. Patent 2,494,563. The preparation and properties of the normally liquid mixture of stereoisomers of di(p-amniocyclohexyl)methane are fully disclosed in U. S. application Serial No. 98,174, filed June 9, 1949 in the name of G. M. Whitman and assigned to the assignee of the instant application. In general, the preparation of normally liquid mixtures of stereoisomers is favored by the use of a ruthenium hydrogenation catalyst at relatively low temperatures whereas higher temperatures and other hydrogenation catalysts favor the production of the higher melting normally solid mixtures of stereoisomers of di(p-aminocyclohexyl)methane.

The properties of the new polyamide of this invention are quite unexpected and were unpredictable. While glutaric acid has been disclosed as a polyamide-forming acid, di(p-aminocyclohexyl)methane is the only primary aliphatic diamine, so far as applicants are aware, with which glutaric acid reacts to give high molecular weight spinnable nylons, i. e., a polyamide having an intrinsic viscosity of at least 0.8. A normally liquid mixture of stereoisomers of di(p-aminocyclohexyl)methane when reacted with glutaric, adipic, or sebacic acids, gives a clear polymer which softens at about 200°–235° C. and has excellent molding properties. When a normally solid mixture of the stereoisomers is used instead of a normally liquid mixture, an opaque polyamide results with glutaric and adipic acids which is too high melting for use in conventional spinning equipment. Further, although polyamide fibers prepared from glutaric, adipic, or sebacic acid with the normally liquid mixture of stereoisomers can be fabricated for use in fabric and bristle applications, these oriented products have considerable shrinkage, above 50%, in boiling water and do not readily respond satisfactorily to setting treatments. As shown more particularly in Example II hereinafter, the bristle properties of these polyamide fibers are materially less favorable than those of oriented filaments of the polyamide of the present invention with respect to both recovery from sharp bending and water sensitivity.

Thus, neither the experience of the prior art with glutaric acid as a polyamide-forming acid nor the properties of polyamides formed by the reaction of glutaric, adipic, or sebacic acids with either a normally solid or a normally liquid mixture of stereoisomers of di(p-aminocyclohexyl)methane would forecast the properties of the polyamide of this invention.

The following examples in which the parts are by weight unless otherwise stated, illustrate specific embodiments of the invention.

*Example I*

To a glass lined pressure resistant vessel was added 52.86 parts glutaric acid, 50 parts of phenol and 84.18 parts of di(p-aminocyclohexyl)methane comprising a mixture of the solid and liquid mixtures of isomers in the ratio of 4:1. The vessel was evacuated and pressured with nitrogen 3 times. It was evacuated to a pressure of 5 mm. of mercury, sealed and heated for one hour at 210° C. The vessel was then opened, heated at 285° C. for one hour under an atmospheric pressure of nitrogen and at 306° C. for ¼ hour at a pressure of 5 mm. of mercury. The polymer thus formed had an intrinsic viscosity of 0.83. A film 20 mil thick was melt pressed at 600 lb./sq. in. at a temperature of 270° C. Narrow foils were drawn at a ratio of 3/1 in water at 100° C. These drawn foils shrank only 5% in water at 100 C. By contrast, drawn foils prepared similarly from the adipic acid polymer of the liquid mixture of isomers of bis(p-aminocyclohexyl)methane shrank 53%.

*Example II*

A glutaric acid polyamide of di(p-aminocyclohexyl)methane comprising the solid and liquid mixtures of isomers in the ratio of 85:15 was prepared as described in Example I. The polyamide had an intrinsic viscosity of 0.86. A film 20 mil thick was melt pressed at a temperature of 270° C. Bristle was prepared by melt extruding a 24 mil filament at 290° C., drawing in mineral oil at 125° C. at a ratio of 3.2:1, and setting in water at 100° C. while wrapped on a form to prevent shrinkage. Recovery from bending was measured by wrapping 10 turns of the bristle around a 90 mil mandrel and maintaining the bristle there for 4 minutes. The bristle was instantly released by cutting one end and allowed to recover in water. Rate of recovery for this bristle was much faster than for bristle from the sebacic acid polyamide of hexamethylenediamine, a commercial nylon bristle. Thus, after cutting from the 90 mil mandrel the subject bristle recovered all but 9% of the bending in 30 seconds and all but 7.5% in 60 seconds with all but 3% recovered in one hour. Bristle from the sebacic acid polyamide of hexamethylenediamine recovered all but 15% in 30 seconds and all but 13% in one minute with all but 4% recovered in one hour. The modulus of elasticity, a measure of the stiffness, for the subject bristle was also higher, being 600,000 lb./sq. in. at 25° C. and 50% relative humidity, and 547,000 lb./sq. in. at 25° C. and 100% relative humidity compared with 480,000 lb./sq. in. at 25° C. and 50% relative humidity, and 280,000 lb./sq. in. at 25° C. and 100% relative humidity for polyhexamethylenesebacamide.

The above comparison of fiber properties shows the definite superiority of the product of this invention as compared to the properties of a typical straight chain aliphatic polyamide. Unexpectedly, the superiority of the instant polyamide is also very definite in comparison to the properties of the polyamide resulting from the reaction of the normally liquid mixture of di(p-aminocyclohexyl)methane with adipic acid. Thus with the adipic acid polyamide, bending as described above resulted in the relatively high non-recovery of 15% in an hour. The modulus of elasticity for the adipic acid polyamide was 450,000 lb./sq. in. at 25° C. and 100% relative humidity.

*Example III*

An autoclave was charged with 17.5 parts of the preformed glutaric acid salt of a solid mixture of stereoisomers of di(p-aminocyclohexyl)-methane, 7.5 parts of the corresponding preformed glutaric acid salt of a liquid mixture of the stereoisomers, and 0.002 part of Dow Corning "Anti-foam A," an organo-silicon oxide polymer. This mixture was flushed with nitrogen and heated for one hour at 204° C. under a pressure of 240 lb./sq. in., followed by heating at 282° C. for two hours at atmospheric pressure and at 284° C. for one hour at 5 mm. of pressure. The polyamide thus obtained had an intrinsic viscosity of 0.91 and a softening temperature of 265° C.–270° C. Oriented fibers after heat setting had a work recovery at 1% elongation of 81, a shrinkage of 7% in boiling water, and a modulus of 42 g./denier and a wet modulus of 29 g./denier. By comparison, polyhexamethyleneadipamide had a modulus of 29 g./denier and a wet modulus of 10 g./denier.

This example serves to illustrate the equivalency of adding the preformed glutaric acid salt of a solid mixture of stereoisomers of di(aminocyclohexyl)methane and the preformed glutaric acid salt of a liquid mixture of the stereoisomers to the reaction vessel as contrasted to adding the separate components forming the salts and then forming the salts in situ, the procedure of Examples I and II. While one procedure may be more convenient than the other depending on circumstances, the particular procedure used has no influenec on the polyamide formed.

The salt of glutaric acid with either the solid or liquid mixture of stereoisomers may be readily prepared, e. g., by mixing separate alcohol solutions of glutaric acid and the mixture of stereoisomers, followed by isolation of the salt which is then condensed to the polyamide by heat, generally at 200° C.–300° C.

It will be understood that the above examples are merely illustrative and that the present invention broadly comprises a linear polyamide having an intrinsic viscosity of at least 0.8, the polyamide being the reaction product of a diamine mixture consisting, by weight, of 50%–90% of a normally solid mixture of stereoisomers of di(p-amino-cyclohexyl)methane and 50%–10% of a normally liquid mixture of stereoisomers of di(p-aminocyclohexyl)methane, with a substantially equimolecular proportion of glutaric acid.

To obtain the linear polyamide as herein described requires that a mixture be used of a normally solid mixture of the stereoisomers of di-(p-aminocyclohexyl)methane and a normally liquid mixture of the stereoisomers within the proportion range recited. It is preferred in order to obtain a polyamide of optimum properties that the normally liquid mixture of stereoisomers amount to 15%–30% of the composite mixture consisting of the liquid and solid mixtures of stereoisomers. The polyamide has an intrinsic viscosity of at least 0.8 and melts within the range of 260° C.–290° C. without decomposition.

Hydrolysis of the polyamide with hydrochloric acid results in the production of glutaric acid and di(p-aminocyclohexyl)methane hydrochloride.

The unexpected and particularly outstanding properties of the polyamide of this invention are the following: (1) The low shrinkage of oriented films and fibers in boiling water. This shrinkage is about 7% whereas similar yarns prepared from polyamides of the liquid mixture of stereoisomers of di(p-aminocyclohexyl)methane and glutaric, adipic, or sebacic acid, all shrink more than 50% in boiling water and do not respond easily to setting treatments. (2) The particularly desirable softening point (260–290° C.) which is sufficiently high for ironing and textile handling operations and below the decomposition point of the polyamide. In contrast to this, the polyamide from glutaric acid and the solid mixture of stereoisomers of the diamine does not fuse below 300° C. and is difficult to spin, whereas the glutaric acid polymer from the liquid mixture of stereoisomers melts at about 200° C. (3) The superior stiffness as compared to available polyamides as shown in Example II. (4) The high rate of recovery from a sharp bend exhibited by the polyamides of this invention which is of outstanding utility in bristle applications. As shown by the data in the examples the rate of recovery from sharp bends is rapid and substantially complete.

The products of this invention may be used in various fiber applications, however, their superior resiliency is most important in bristle applications. Their relative insensitivity to water is of further utility in various brush uses where the bristle is subjected to moisture.

As many apparently widely different embodiments of this invention may be made without departing from the spirit and scope thereof, it is to be understood that the invention is not limited to the specific embodiments thereof except as defined in the appended claims.

The invention claimed is:

1. A linear polyamide having an intrinsic viscosity of at least 0.8, said polyamide being the reaction product of a diamine mixture consisting, by weight, of 50%–90% of a solid mixture of stereoisomers of di(p-aminocyclohexyl)methane, said mixture melting above 40° C., and 50%–10% of a liquid mixture of stereoisomers of di(p-aminocyclohexyl)methane, said mixture being liquid at 25° C., with a substantially equimolecular proportion of glutaric acid.

2. A linear polyamide having an intrinsic viscosity of at least 0.8, said polyamide being the reaction product of a diamine mixture consisting, by weight, of 70%–85% of a solid mixture of stereoisomers of di(p-aminocyclohexyl)methane, said mixture melting above 40° C., and 30%–15% of a liquid mixture of stereoisomers of di-(p-aminocyclohexyl)methane, said mixture being liquid at 25° C., with a substantially equimolecular proportion of glutaric acid.

3. An oriented filament of the polyamide recited in claim 1.

DONALD CARGILL PEASE.
CARLETON THOMAS HANDY.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,252,554 | Carothers | Aug. 12, 1941 |
| 2,512,606 | Bolton | June 27, 1950 |

FOREIGN PATENTS

| Number | Country | Date |
|---|---|---|
| 67,203 | Norway | Dec. 20, 1943 |

OTHER REFERENCES

Ser. No. 392,812, Kroeper et al. (A. P. C.), published Apr. 20, 1943.

De Bell et al., Berman Plastics Practice, 1946 p. 289.